Sept. 30, 1969 W. BECKER 3,469,447
DEVICE FOR MEASURING THE TEMPERATURE OF A LIQUID
Filed April 27, 1967
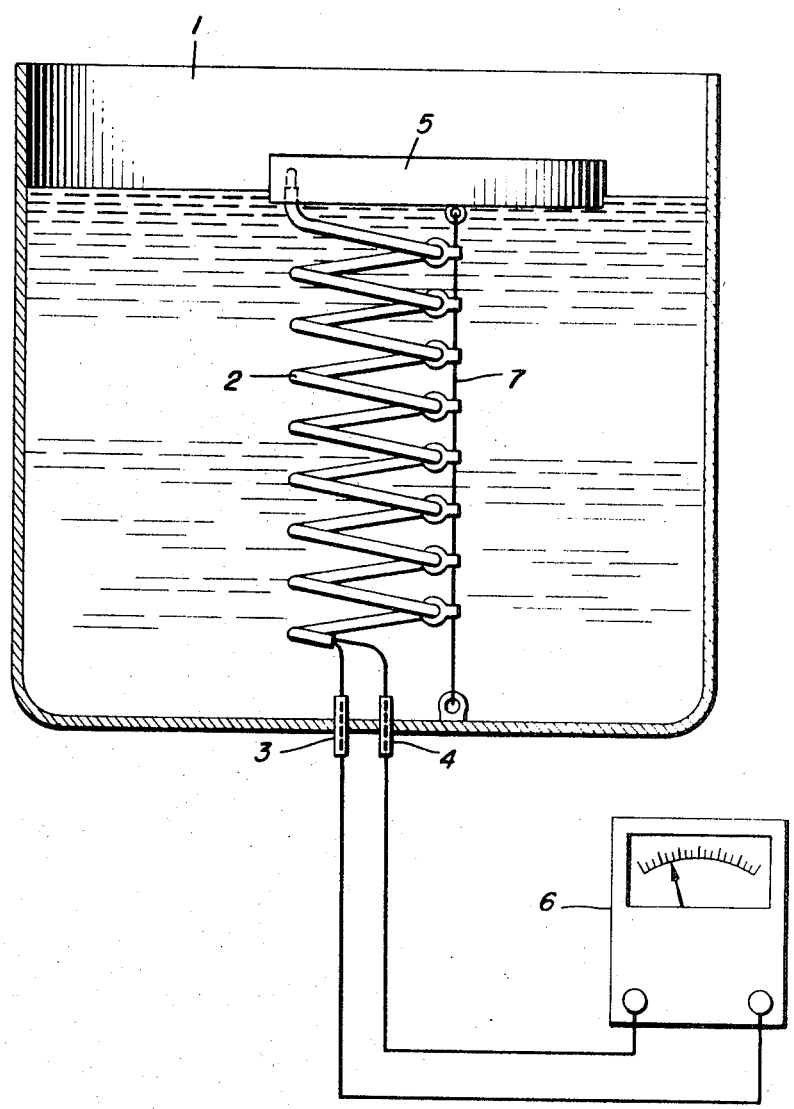
INVENTOR.
Winfried Becker
BY *Stevens, Davis, Miller & Mosher*
ATTORNEYS 3,469,447
DEVICE FOR MEASURING THE TEMPERATURE OF A LIQUID
Winfried Becker, Arolo di Leggiuno, Italy, assignor to European Atomic Energy Community (Euratom), Brussels, Belgium
Filed Apr. 27, 1967, Ser. No. 634,233
Claims priority, application Germany, Aug. 4, 1966, E 32,211
Int. Cl. G01k 3/02
U.S. Cl. 73—342                        2 Claims

ABSTRACT OF THE DISCLOSURE

A device for measuring the average temperature of a liquid contained in a vessel or a container including a helically shaped wire connected to a float on the surface of the liquid and extending down to the bottom of the vessel or container to a Wheatstone bridge or the like.

Background of the invention

The present invention relates to a device for measuring the temperature of a liquid, and particularly a device for measuring the average temperature of a liquid in which the temperature of the liquid may be stratified horizontally and the level of which is subject to variations.

It is often necessary to know the average temperature of the liquid contained in a vessel or container. For instance, in order to determine the average density of a liquid, so that the level of the liquid may be ascertained by means of a differential pressure measuring instrument, it is necessary to know its average temperature.

The measuring of the average temperature along a defined path by means of a resistance wire placed along the path is well-known. This is illustrated in the book by Baker, Titer and Baker, entitled "Temperature Measurement in Engineering," vol. II, page 15, New York, 1961. However, the difficulty with this method is that in measuring the average temperature of a liquid whose level varies, there is no positively defined path.

Summary of the invention

It is an object of the present invention to provide a device utilizing a resistance wire for measuring the average temperature of a liquid whose level varies.

It is another object of the present invention to provide a device for measuring the average temperature of liquid in a container including a resistance wire formed into a helix, one end of which is fastened to a float on the surface of the liquid, and the other end extending through the bottom of the liquid container to a measuring device.

It is also an object of the present invention to provide measuring means including a resistance wire formed into a helix, whereby the pitch of the helix from the top of the helix to the bottom of the helix is constant.

The device of the present invention provides means for measuring the average temperature of a liquid having a variable level utilizing a float adapted to ride on the surface of the liquid. Connected to said float is a bifilar helical resistance wire extending down from the float and through the bottom of the vessel containing the liquid to a Wheatstone bridge or the like. The variation in the average temperature of the liquid is reflected by the change in the resistance of the helical wire indicated on the Wheatstone bridge.

Other details, objects and advantages of the present invention will become apparent in the following description of the present embodiment thereof, taken in conjunction with the drawing which accompanies and forms part of the specification.

Brief description of the drawing

In the drawing:
The figure is a side view illustrating a preferred embodiment of the present invention.

Description of the preferred embodiment

Referring to the drawing, there is shown a vessel or container 1 containing a liquid which is stratified substantially horizontally in accordance with its temperature, the average temperature of which is to be measured. In accordance with the present invention, the resistance wire 2 in a bifilar arrangement is formed in a helix with terminals 3 and 4 located at the bottom of the container or vessel 1. The wire is protected by suitable insulating layers which prevent the electrical current from passing into the liquid and also prevent corrosion of the wire. At the upper end of the wire, the two portions are electrically connected to each other and fastened mechanically to a float 5.

In order to maintain the pitch of the helix constant through the entire depth of the liquid of which the average temperature is taken, regardless of the weight of the wire forming the helix itself, an elastic supporting member 7 may be connected to the helix. This elastic supporting member may take the form of an elastic line or an elastic bouyancy tube connected to each of the turns of the helix.

Connected to terminals 3 and 4 is a measuring instrument 6 which may take the form of a Wheatstone bridge, with the helical resistance wire forming the leg of the bridge measured.

The measuring instrument thus measures the average temperature of the liquid independently of the instantaneous level of the liquid, and is dependent only linearly on the resistance of the wire.

While the helix shown in the drawing is bifilar so as to pass the terminals of the wire through the bottom of the container or vessel 1, the terminals could also be arranged to float on the top of the helix or the helical wire could be monofilar with the connections made at both ends. The constant pitch could also be maintained by bouyancy bodies mounted on the individual turns rather than by an elastic member as shown in the drawing.

Thus, while I have shown the preferred means of practicing the present invention, it must be understood that various changes may be made by those skilled in the art without departing from the spirit of the invention.

I claim:
1. A device for measuring the average temperature of a body of liquid, the level of which is stratified horizontally, comprising a float for floating on the surface of said liquid, a helical wire connected to said float and extending to the bottom of the body, means connected to said wire for measuring the total resistance thereof which is proportional to the average temperature, and an elastic member which extends from said float to said bottom along substantially a straight line and which is connected to several of the individual turns of the helical wire at equidistant points along this straight line.

2. A device according to claim 1, in which all individual turns of the helical wire are connected to the elastic member at points along the same straight line.

References Cited

UNITED STATES PATENTS 3,111,846 11/1963 Willer _____ 73—353
2,746,293 5/1956 Quist _____ 73—353

FOREIGN PATENTS 692,064 5/1953 Great Britain.

LOUIS R. PRINCE, Primary Examiner
DENIS E. CORR, Assistant Examiner

U.S. Cl. X.R.

73—353